United States Patent [19]

Ahluwalia et al.

[11] Patent Number: 4,665,143

[45] Date of Patent: May 12, 1987

[54] CO-CATALYST DISPERSION METHOD

[75] Inventors: Mohinder S. Ahluwalia, Lake Charles; Michael L. Junker, Baton Rouge, both of La.

[73] Assignee: Cities Service Oil & Gas Corp., Tulsa, Okla.

[21] Appl. No.: 722,633

[22] Filed: Apr. 12, 1985

Related U.S. Application Data

[63] Continuation-in-part of Ser. No. 585,038, Mar. 7, 1984, abandoned, which is a continuation-in-part of Ser. No. 397,656, Jul. 12, 1982, abandoned.

[51] Int. Cl.$^4$ ................................................. C08F 2/34
[52] U.S. Cl. ........................................ 526/88; 526/86; 526/87

[58] Field of Search ............................... 526/86, 87, 88

[56] References Cited

U.S. PATENT DOCUMENTS 4,287,327  9/1981  Michaels ............................... 526/86

Primary Examiner—Paul R. Michl
Attorney, Agent, or Firm—George Rushton; John Wade Carpenter

[57] ABSTRACT

In a gas-phase fluidized-bed polyethylene reactor using a Ziegler catalyst under operating conditions, a co-catalyst, such as triethyl aluminum, is added to the reactor by mixing the TEA with some of the feed ethylene and pumping the solution into the reactor.

58 Claims, 1 Drawing Figure

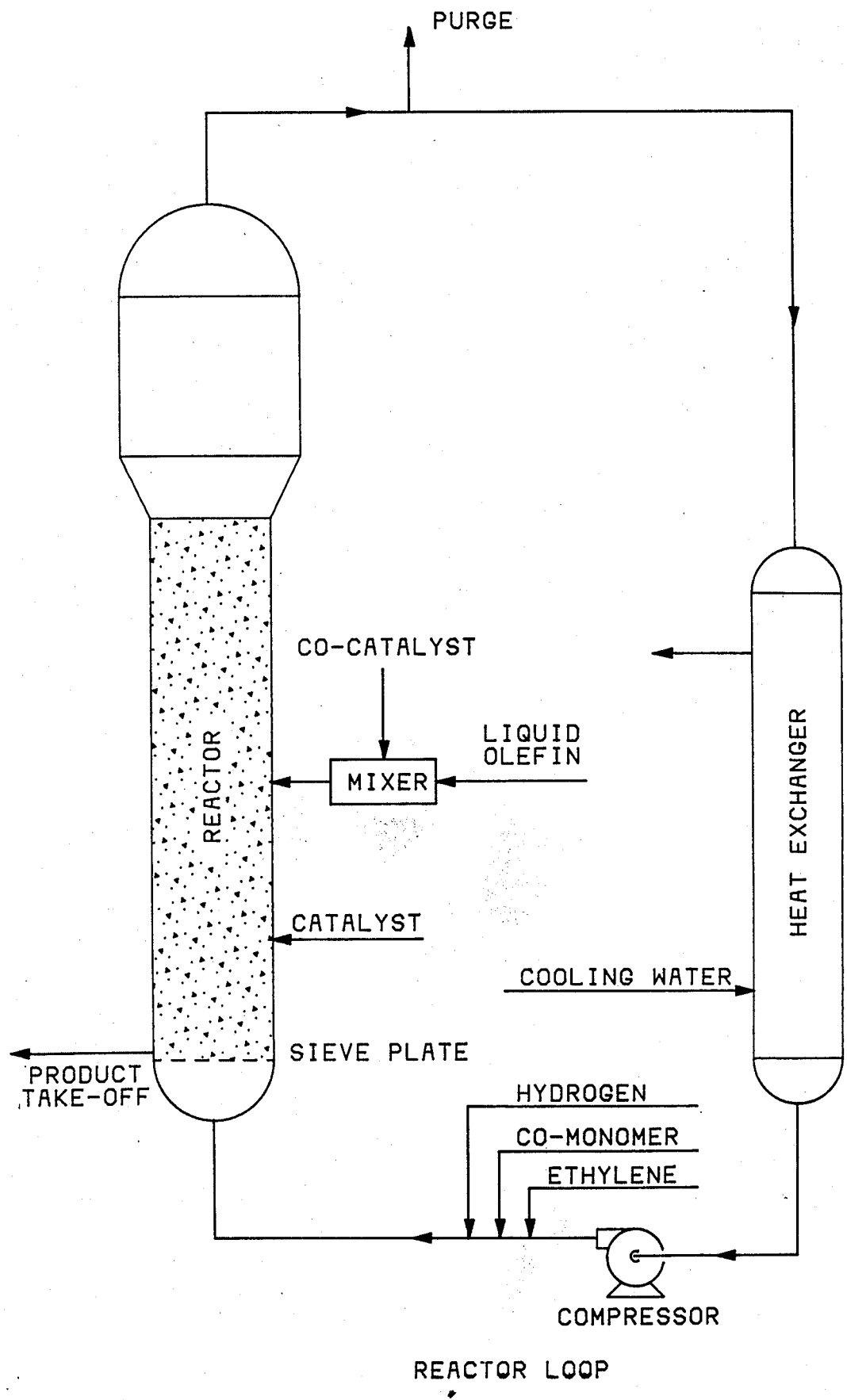

CO-CATALYST DISPERSION METHOD

BACKGROUND OF THE INVENTION

This application, Ser. No. 722,633, is a CIP of application Ser. No. 585,038, filed Mar. 7, 1984, abandoned which is a CIP of application Ser. No. 397,656, filed July 12, 1982, now abandoned.

This invention relates to catalysts used in the polymerization of olefins. More particularly, it relates to the addition of a co-catalyst into a gas-phase fluidized-bed olefin polymerization reactor. In a preferred embodiment, the invention relates to dilution of the co-catalyst by the olefin to be polymerized, prior to the introduction of the co-catalyst into the gas-phase fluidized-bed olefin polymerization reactor wherein a Ziegler catalyst is used, so that the co-catalyst is substantially uniformly dispersed in the fluidized bed of the reactor. The utility of the invention lies in its use in polyolefin production.

In a gas-phase fluidized-bed reactor for the polymerization of olefins, wherein a Ziegler catalyst is used, such as for the production of high density polyethylene or linear low density polyethylene, the olefin-containing polymerization gas mixture, in the gas-phase but under pressure, is fed into the reactor, where it contacts a fluidized-bed of polymer particles containing the supported Ziegler polymerization catalyst. For such polymerization, a co-catalyst is needed. Broadly, organometallic compounds of Periodic Groups I, II, and III are used as co-catalysts. One example of such a co-catalyst is an aluminum alkyl, such as triethyl aluminum (TEA).

In a gas phase reactor, the various streams that typically enter the reactor, assuming the fluidized-bed of polymer particles is in place, comprise a Ziegler catalyst, the polymerizable olefin, hydrogen (molecular weight modifier), a co-monomer olefin (such as propylene, as a density modifier) and a co-catalyst. Since it is preferred that the co-catalyst, such as TEA, be added so that a proper amount contacts a proper amount of catalyst, various methods of adding co-catalyst to the reactor have been tried.

Various ways have been used to introduce an aluminum alkyl co-catalyst into a gas-phase, fluidized-bed polymerization reactor when a Ziegler catalyst is used. One way is to deposit or coat the co-catalyst on polymer particles which have been made in the process, and return these coated particles to the fluidized bed. However, as shown by Ort in U.S. Pat. No. 3,925,338, this procedure requires comminution and sieving to obtain small particles, or else the particle size in the bed is increased to the point that proper fluidization cannot be maintained. Another way is to prepolymerize a small amount of olefin with the catalyst in a slurry in order to encapsulate the catalyst, add co-catalyst, evaporate the solvent to deposit or coat the co-catalyst on the outside of the polymer capsule, and feed the coated capsule to the fluidized bed. Although technically this procedure seems to work, it introduces an extra step in commercial fluidized-bed operation, with consequent increase in cost. What one desires, for commercial operation, is a procedure in which catalyst and co-catalyst can be fed directly to the fluidized bed without expensive extra steps. One obvious possibility is to feed the co-catalyst in an inert solvent. However, as Michaels, et al. teach in U.S. Pat No. 4,287,327, this procedure leads to an increase of particle size which, in a fluidized bed, leads to loss of fluidization. If the solvent is inert, build up of inert material in the system also occurs, leading either to loss of production rate due to reduction of monomer concentration or to a costly purge of inert material.

It has been found when pure, undiluted co-catalyst is fed to a fluidized bed reactor, the co-catalyst does not disperse well in the bed, leading to uneven catalysis and excessive co-catalyst usage. Since most co-catalysts have a low vapor pressure, it is not possible to heat them to such a temperature that the resultant vapor can be introduced with the olefin feed. Various attempts have been made to form an atomized mist of the co-catalyst prior to introduction into the reactor, but it has been found that such a mist gives fairly large droplets that contact the catalyst particles, resulting in overloading of a few catalyst particles with the co-catalyst and underloading of others, with subsequent reduction of catalyst activity. What is still needed is a way of adding co-catalyst to a gas-phase, fluidized bed polyolefin reactor which (1) is simple and inexpensive to practice commercially, (2) minimizes or eliminates introduction of inert material, (3) provides good co-catalyst dispersion in order to minimize co-catalyst usage and provides even catalysis, (4) reduces the existence of localized temperature rises in the reactor bed, and (5) does not produce non-fluidizable particles.

SUMMARY OF THE INVENTION

If conditions can be found so that a smaller amount of co-catalyst contacts each catalyst particle, a more controlled and uniform reactivity should result. We believe that we have found these conditions, thus offering a simple and efficient method of introducing the co-catalyst into the reactor so that the catalyst particles in the fluidized-bed contact the desirable amount of co-catalyst and sustain a desirable level of polymerization activity.

Our invention is a method of adding a co-catalyst to a gas-phase fluidized-bed olefin polymerization reactor that is operating under commercial conditions using a Ziegler catalyst. In a separate container external to the reactor, we mix the co-catalyst with a liquid polymerizable olefin, thus forming a solution of co-catalyst and olefin. This solution is then introduced or fed into the reactor at a reaction-sustaining rate. The liquid olefin vaporizes, leaving the co-catalyst on the polymer particles.

DESCRIPTION OF THE DRAWING

The FIGURE shows a flow diagram of a closed-loop, gas-phase, polymerization system, as one embodiment of the apparatus used for this invention.

The vertical, cylindrical reactor shown is exemplary of a reactor used in a gas-phase, fluidized-bed polymerization zation process. The middle section of the reactor is where the fluidized bed of polymer particles is found, while the upper section of the reactor forms an expanded volume for solid-gas disengagement. A purge line in the loop system offers a means of venting inert materials from the circulating gas stream. A heat exchanger offers a means of controlling the temperature of the circulating gas stream. A gas compressor is used to circulate the gas mixture in the loop at a rate sufficient to maintain proper fluidization in the bed. Ethylene, co-monomer, and hydrogen gases are introduced into the gas stream prior to introduction of the gas stream into the reactor. The combined gas stream enters the fluidized bed of the reactor through a distribution sieve plate, which also offers a support for the fluidized bed. A product take-off line for the polymer powder is located, in this embodiment, in the lower fluidized bed portion of the reactor. A catalyst inlet line is located above, or downstream of, the product take-off line. Co-catalyst and liquid olefin lines lead to a mixer, with the resultant mixture being introduced into the reactor at a point downstream of the catalyst injection line.

DETAILED DESCRIPTION OF THE INVENTION

Although this invention can be used with a majority of olefin polymerizations, it is preferred for those olefin polymerizations that take place in a gas-phase fluidized-bed reactor. Examples of such polymerizations are those involving high density polyethylene (HDPE) and linear low density polyethylene (LLDPE), in which the monomer is substantially ethylene. It is particularly preferred with ethylene-based polymerizations because they are so exothermic. For example, polymerization of ethylene releases about 50% more heat per pound of product than polymerization of propylene, and about 100% more than butene-1. Thus the following discussion is primarily concerned with the use of ethylene as a diluent or solvent for the co-catalyst used in an ethylene polymerization reactor.

Other olefins, such as propylene, can be used as diluents, but ethylene is preferred because it vaporizes more quickly and is the major constituent of the polyethylenes. Alpha-olefins are not used when preparing ethylene homopolymers. Therefore, if the co-catalyst is added as a solution in ethylene, a series of ethylene homopolymers and copolymers with different alpha-olefins can be made in a commercial reactor without repiping the co-catalyst addition system.

Broadly, a gas-phase fluidized-bed polymerization reactor concerns a closed-loop reactor, such as shown in the FIGURE, in which catalyst/polyolefin particles form a fluidized bed. These particles are called polymer particles. The terms "polymer bed" and "bed of polymer particles" refer to the inventory of polymer particles present in the reactor. Fresh polymerization catalyst and the co-catalyst solution of this invention are introduced, separately, into the reactor and thus contact these polymer particles. Some polyolefin has formed from polymerization around an active catalyst site. As additional gaseous olefin contacts such a particle, additional polyolefin is formed. Periodically, some of the polymer bed needs to be removed, to maintain a constant polymer inventory in the reactor. Fresh catalyst, exemplified by a supported Ziegler catalyst, is added to the reactor, to maintain a desirable production rate. A co-catalyst is needed in the reactor to activate or increase the activity of the catalyst and maintain its activity. Examples of co-catalysts are trialkyl aluminum compounds such as triethyl aluminum (TEA) and trihexyl aluminum, alkyl aluminum hydrides such as diisobutyl aluminum hydride, alkyl aluminum halides such as diethyl aluminum chloride, and alkyl aluminum alkoxides such as diethyl aluminum ethoxide.

The Figure shows a flow diagram of a closed-loop gas phase polymerization system. The Figure does not show the typical auxiliary equipment, such as temperature, pressure, and level controls, gas analyzers, and automatic instrument control loops. It is not intended to convey specific engineering designs. It is merely an illustrative flow diagram.

In the reaction zone of the gas-phase fluidized-bed reactor is a bed of particles consisting essentially of solid powder or granules of the polymer being produced by the polymerization reaction. Some of the particles contain traces of active catalyst and, under polymerization conditions in the reaction zone, add monomer and grow to larger size. Other particles are not growing. The bed particles may vary in size and shape, but generally can be approximately characterized by an average particle size and a range or distribution of particle sizes. For good operation of a gas-phase fluidized-bed polymerization process, the average particle size should be between about 100 microns and about 5000 microns, with about 400 to about 1200 microns being preferred. For good fluidization, there should be a distribution of particle sizes such that there are some small particles which fluidize easily and some large particles which, though fluidized, move more slowly and, to some extent, "trap" the smaller particles in the bed. Good fluidization does not occur when all particles are the same size and shape.

Into the bed of polymer particles is fed a Ziegler polymerization catalyst. Because the catalyst is generally in a form that will react with olefins, it is preferable that the catalyst be kept in an inert atmosphere until the time it enters the reactor. An inert atmosphere consists of any gas or mixture of gases that will not react with the catalyst. Suitable gases include nitrogen, argon and methane. The amount of catalyst may be measured by any suitable means that measures volume, weight or flow and which gives a measurement which can be related to the amount of catalyst. Once the amount of catalyst has been measured, the catalyst can be delivered to the reaction zone of the reactor by any suitable means. Mechanical means include screw or belt conveyors and pumps. Alternatively, catalyst can be transported from the measuring means to the reaction zone by the motive force of flowing gas. Suitable gases for this purpose include inert gases, any of the feed gases of the polymerization, recycle gas from the closed-loop system, or mixtures thereof.

Active catalyst particles in the reaction zone react with the reactive gases in the zone. The principal reaction is with the monomer(s) present to cause polymerization. As polymerization takes place on the catalyst, the catalyst becomes embedded in the polymer it is producing. The particle size of the particle grows as polymerization on the catalyst particle takes place. For this reason, it is preferred that the catalyst particles be small enough that polymer can grow without the final polymer particles being too large to fluidize properly. Catalyst average particle size may range from about 1 to 500 microns, with about 20 to 250 microns being preferred. Some catalysts fragment during the early stages of polymerization, making it possible to have catalyst particles near the upper end of the general or preferred size ranges without generating polymer particles that are too large.

Because catalyst particles are generally smaller than most polymer particles, it is preferred to add fresh catalyst to reaction zone below the top of the fluidized bed, for instance at a point between the sieve plate and a point about ⅞ of the distance to the top of the bed, so that polymerization can occur on catalyst particles before they reach the top of the bed. Otherwise, excessive carry over of fresh catalyst particles into the recycle system could occur. More preferred is to add the catalyst at a point between about ⅛ and about ½ of the distance between the sieve plate and the top of the bed. Fluidization is generally poorest right at the sieve plate.

Adding the catalyst at or about a point about ⅛ of the bed height above the sieve plate assures that the catalyst will be added in a region of good fluidization. Adding it at or below a point about ½ of the bed height above the sieve plate assures ample time for the catalyst particles to grow to a size not easily transported out of the bed by the fluidizing gas before the particles, by normal fluidized motion within the bed, migrate to the top of the bed. Although the FIGURE shows only a single catalyst entry point, it should be understood that this invention is equally applicable to a multiplicity of catalyst entry points as long as the requirements of the invention are maintained. Subsequent discussion will be couched in terms of a single entry point for simplicity of explanation.

The rate of polymerization depends, in part, on the amount of active catalyst in the bed. Therefore, the rate of catalyst addition is an important variable. However, the rate of addition depends on many factors including inherent activity of the catalyst, concentration of active sites on the catalyst particles and size of the reactor. It is therefore more useful to consider concentration of active catalyst in the reaction zone, and set the catalyst feed rate to give this concentration. A convenient measure of concentration is the ppm (by weight) of transition metal which forms the active catalyst. For Ziegler catalysts, this metal is generally either titanium or vanadium. Concentration of transition metal in the bed is generally in the range of about 0.1 to about 100 ppm, with about 0.5 to about 20 ppm preferred, and about 1 to about 4 ppm more preferred. When the concentration of transition metal is sufficiently low, as suggested by the preferred and more preferred ranges, catalyst removal from the polymer product is generally not required.

The bed, consisting essentially of polymerized particulate polymer and traces of catalyst and co-catalyst, is fluidized by upwardly flowing gas. This gas passes through the bed in the reaction zone and through the recycle piping and heat exchange to the compressor where it is pumped again to the bottom of the reaction zone. Generally, less than 3% of the gas passing through the reaction zone reacts to form polymer during the single pass, often less than 2%. The unreacted gas comprising ethylene may be analyzed by gas analyzers. These analyses may be used to control the flows of make-up ethylene, hydrogen and co-monomer(s) which may be added to the recycle stream as shown in the FIGURE in order to keep constant the composition of the gas mixture passing through the bed. The invention does not depend upon the exact point(s) or method(s) of adding make-up gases.

It is well known in fluidized-bed are that, below a certain flow of fluidizing medium, the particulate bed will not be fluidized. The flow at which the bed will just be fluidized is termed the minimum fluidization velocity and is usually represented by the symbol $G_{mf}$. $G_{mf}$ for any system depends upon the characteristics of the fluidizing medium and the density, shape, and particle size and size distribution of the particles. For "as polymerized" polyethylene particles as produced in this invention and substantially ethylene gas mixture as the fluidizing medium, we have measured $G_{mf}$ to be about 15 cm/sec within the pressure range of about 100–600 psi (7–42.3 kg/cm²) and temperature range of about 122°–248° F. (50°–120° C.). Within these ranges, $G_{mf}$ appears to be essentially constant within experimental error.

However, it is not preferred to operate a highly exothermic gas-phase fluidized-bed reaction at or near the minimum fluidization velocity since any disturbance could cause loss of fluidization. On the other hand, if the velocity of the fluidizing medium is too high, the bed particles will be blown out of the bed. The velocity at which particles are just lifted out of the bed by the fluidizing medium is called the minimum transport velocity, and varies in proportion to the size of the particles: small particles are transported out of the bed at a lower velocity than large particles. In order to permit a wider range of recycle gas flow rates than otherwise possible while minimizing the amount of particulate matter transported into the recycle system, an enlarged section frequently called a "disengaging zone" or "velocity reduction zone" is placed atop the reaction zone, as shown in the FIGURE. The linear flow rate of upwardly rising gas is reduced by the square of the increase in diameter. If the diameter of the disengaging zone is twice that of the reaction zone, for instance, the linear velocity of the gas in the disengaging zone will be ¼ that of the velocity in the reaction zone. Therefore, particles which are transported out of the fluidized bed because the velocity in the reaction zone equals or exceeds the transport velocity for those particles, will generally drop back into the bed from the disengaging zone because the velocity in that zone will be below their transport velocities. A properly designed disengaging zone will also prevent carry over of particles into the recycle system, particles which splash up from the bed as a result of the bubbling action that normally takes place at the top of a fluidized bed.

For polymer particles made by the present invention, we have found that the recycle gas velocity which begins to give appreciable particle transport is about 4 $G_{mf}$, or about 60 cm/sec, within the above-cited pressure and temperature limits. A fluidizing gas velocity in the reaction zone of about 1.5–3.0 $G_{mf}$ or about 23–45 cm/sec, is preferred because it leaves a margin of operational safety for errors or minor upsets.

After the gas leaves the disengaging zone and before it reenters the reaction zone, it can be sampled and analyzed. The FIGURE shows one convenient point at which a small purge can be taken which will supply gas to on-line or off-line gas analyzers. The same point or another point can be used to take a purge stream for the purpose of reducing the amount of inert material in the system. Inert gases can be introduced in at least three ways. Ethylene (or other olefins) can contain small amounts of alkanes which, being inert, will tend to build up in the recycle system as the monomers are consumed. The catalyst is stored, and can be fed, under an inert atmosphere. Inert gas entering the reaction zone with the catalyst will also tend to accumulate in the recycle system. It is known to introduce co-catalyst into the reaction zone in solution in an inert solvent. To the extent that inert materials displace reactive gases in the closed-loop system, efficiency of the polymerization process is lessened. The total concentration of inert gases can be reduced by increasing the purge rate from the reaction system. Purged gases can be flared or can be repurified and reused. However, it is costly in commercial operations to waste or repurify, so it is preferred to keep the purge close to the minimum amount needed for proper gas analysis. To do this, it is preferred to minimize or eliminate inert materials coming into the system.

The pressure at which the polymerization process of this invention is conducted is selected on the basis of desired commercial operation rather than upon some limitation of the invention. This invention can be practiced at atmospheric, subatmospheric, or superatmospheric pressures. For economy of operation, one wishes to polymerize near the highest pressure for which the equipment is designed in order to maximize the production rate for the equipment. But, because commercial process equipment generally is more expensive with the higher pressure, there is a natural tendency to design commercial equipment for low pressures. These constraints lead to a commercial operating range of about 100–600 psi (7–42.3 kg/cm$^2$). At the lower pressures, however, higher dwell times in the reactor are required to reach high yields of polymer per unit of catalyst. At the higher pressures, there is little room to safely accommodate pressure upsets. These constraints lead to a preferred pressure range of about 230 to about 565 psi (16.3–39.7 kg/cm$^2$).

The function of the heat exchanger shown in the FIGURE is to remove the heat of polymerization from the system. Cooled recycle gas enters the bottom of the reaction zone and hot gas leaves, as the circulating gas picks up heat from the polymerizing particles in the reaction zone and conveys this heat to the exchanger. Fluidized-bed reactors with external heat exchange depend upon the fluidizing capability of the upwardly flowing gas and the fluidizability of the particles in the bed to accomplish the mixing in the bed required to transfer the heat of polymerization from the particles to the gas. If the mixing is inadequate to accomplish this, "hot spots" (regions of localized high temperature) will develop in the bed.

Ziegler catalysts are, broadly, considered as materials formed from a transition metal, selected from Groups IV-A, V-A, VI-A, VII-A, and VIII, and a metal alkyl, with the metal selected from Groups I-A, II-A, and III-B. Exemplary metals from Groups IV-VIII are Ti, Zr, V, W, Mn, and Ni. Preferred metals are Ti and V. Examples of metal alkyls are n-amyl sodium, butyl lithium, magnesium ethyl chloride, triethyl aluminum, dimethyl aluminum chloride, ethyl aluminum diethoxide, and di-isobutyl aluminum hydride. A preferred metal alkyl is triethyl aluminum (TEA). A catalyst support is exemplified by silica, alumina, magnesia, silica-alumina, zirconia, etc. A preferred support is silica. Additional information concerning supported Ziegler catalysts can be found in U.S. Pat No. 4,426,317 (Rogers) and U.S. Pat. No. 4,435,520 (Aylward), and these patents are hereby incorporated by reference.

Ziegler catalysts polymerize olefins over a wide temperature range, but there is a practical limitation to the temperatures allowable in a stably-operating fluidize-bed polymerization. For example, above about 120° C. (248° F. ), ethylene polymers soften. In a fluidized bed, softened particles will tend to agglomerate by sticking together. These agglomerates are harder to fluidize, so lose heat less readily to the gas, and, by a "snowballing" effect, become clumps or chunks. Thus, if the temperature in a localized region reaches or exceeds the softening temperature of the polymer, this "hot spot" will cause a chunk to form. By "chunk" we mean a polymer particle or agglomerate of polymer particles too large and heavy to be fluidized by the upwardly flowing gas. Therefore, chunks will sink downwardly in the fluidized bed until they come to rest on the sieve plate. Below about 50° C. (122° F.), the production rate of commercial reactors becomes so low that the process is no longer profitable. It is generally desirable to operate near the highest temperature at which the polymer will not agglomerate, since this permits the heat exchanger to operate with a high delta T which leads to efficient heat exchange. Because it is wise to have some safety factor for operating errors or minor upsets, the temperature range of about 149°–239° F. (65°–115° C.) is preferred, with about 167°–230° F. (75°–110° C.) being most preferred.

Although the FIGURE illustrates a heat exchanger in the recycle gas system, and this is common commercial practice, this invention is not limited by this particular embodiment or by any particular method of removing the heat of reaction. Thus, this invention may also be practiced when the heat of polymerization is removed through the walls of the reaction zone, or when a heat exchanger is placed within the reaction zone itself, or when any combination of heat exchange methods is used.

The volume and weight of the polymer product in the reaction zone increase as the particles grow in size as the result of polymerization. For a gas-phase fluidized-bed polymerization process to operate continuously, as is preferred for commercial operation, polymer particles are removed from the reaction zone either continuously or from time to time in order to keep the product inventory in the fluidized bed approximately constant. One convenient method of removing a product is to have a settling leg separated from the reaction zone by a valve. When the valve is opened, particles of product fill the leg. The valve is then be closed. If the settling leg also has a valve on the other end, this other valve can be opened and the contents of the leg discharged. Such a product take-off system can be operated manually or automatically. Instrumentation is readily available which will measure either the weight of the product in the reaction zone or the height of the fluidized bed. Either measurement can be used to sense an increase in inventory of polymer in the reaction zone and signal a product take-off control system.

The take-off system is shown in the FIGURE connected to the reaction zone at a point just above the sieve plate. However, there can be one or more take-off systems located at one or more points anywhere within the region occupied by the fluidized bed. For simplicity of explanation, discussion will be couched in terms of a single take-off system located at a single take-off point. Locating the take-off point near the sieve plate has the advantage that fresh catalyst particles will not be removed. As explained above, fresh catalyst particles generally have smaller sizes than polymer particles and, by the natural dynamics of fluidization, tend to concentrate in the upper portions of the bed. However, there is a disadvantage in locating the take-off point near the sieve plate: any chunks that form will tend to migrate to the take-off system and may plug it. Although a product take-off system is needed for economic commercial operation, this invention is not limited to the type, number, location, operational parameters or mechanical designs of such systems.

During fluidized-bed operation, the function of the sieve plate, also sometimes called the "distributor plate", is to distribute the upwardly flowing gas properly as this gas enters the particle bed so that there are no stagnant zones in the reactor. As can be understood from the above description of "hot spots", any stagnant region containing catalyst will generate a chunk because heat will build up inside the stagnant volume and cause particle fusion. Unfortunately, when a chunk forms and settles to the sieve plate, it disrupts proper gas flow at that point and also, to some extent, inhibits the normal, lateral motion of fluidizable particles on the top surface of the sieve plate which also seems to be essential to chunk avoidance. Thus, formation of one chunk makes it easier to form a second chunk. This effect "snowballs" until the reactor becomes inoperable, either due to channelling of upward gas flow around chunks and loss of normal fluidized-bed mixing, or due to a chunk moving into the product take-off system and plugging it. Therefore, avoiding "hot spots" and formation of chunks (non-fluidizable particles) is important for stable, long-term operation of gas-phase, fluidized-bed, ethylene polymerization reactors.

Gas-phase fluidized-bed reactors operate differently than tumble-bed, rotating-bed, or stirred-bed reactors, and each type has its own distinct advantages and disadvantages that causes it to be preferred for different processes. Fluidized bed reactors are simpler to clean and repair and less expensive to construct.

Tumble-bed, stirred-bed, and rotating-bed processes depend primarily upon externally-supplied mechanical motion to accomplish mixing, and therefore do not have either the gas flow rate or particle size restrictions that fluidized beds have. Some also employ a volatile liquid as a heat transfer aid by evaporating it in the bed, taking advantage of the cooling effect of vaporization, and then condensing the liquid outside the reactor. Although such processes have these advantages, they do not work well for ethylene polymers because mechanically-supplied mixing is generally not intensive enough to prevent "hot spots" in ethylene polymerization for which the heat of polymerization is so much higher than for other olefins and for which the softening point of the polymer is lower than for isotactic polypropylene, for example.

When a proper amount of co-catalyst contacts a particle comprising polyolefin and a catalyst nucleus, the catalyst is activated, and the rate of polymerization of ethylene on the catalyst particle is increased. When this polymerization of ethylene on such a particle takes place for a period of time, the particle grows to a size where it is ultimately removed from the reactor. Experience has shown that this size is well within the size range of particles that are fluidizable at normal flow rates of upwardly rising gas in the reactor. Proper introduction of co-catalyst, therefore, contributes to stable operation of the reactor and does not contribute to "hot spots" or destabilization of operation.

According to this invention, the catalyst is added to the fluidized bed as a dry powder. It can be added continuously, semi-continuously, or discontinuously. It can be added as pure catalyst, supported or unsupported, or can be diluted with inert solid. In catalyst feeding, it is important that the rate of addition be controlled and that the catalyst be dispersed in the bed before a "hot spot" develops. Ziegler catalysts can be active as fed to the reactor, or can be deactivated prior to addition and fed in an inactive form. If they are active, the co-catalyst enhances activity. If they are inactive, the co-catalyst creates activity. In either instance, catalyst activity is increased and more heat of polymerization is generated, which must be dissipated, than would be generated in the absence of co-catalyst. It is therefore important that the co-catalyst be fed at a point sufficiently removed from the catalyst entry point so that one does not encounter a condition where a high concentration of catalyst and a high concentration of co-catalyst exist in the same region. Such a condition inevitably results in a "hot spot" and chunk formation.

A fluidized bed is an excellent mixer. This is underscored by the fact that very exothermic reactions, such as ethylene polymerization, can be run in well-fluidized reactors with little axial or radial variation in temperature within the bed. We have found that the temperature of cool gas coming into the bottom of a well-fluidized bed reaches the average temperature of the bed within about 15 cm of height above the sieve plate, and that throughout the rest of the fluidized bed temperatures are essentially constant. In a similar manner, if a region of higher-than-average temperature, such as due to localized heat of reaction, is present in the fluidized bed, this temperature difference is moderated to the average temperature within about 15 cm. The same mixing action which gives temperature equilibration will also give equilibration of solids concentrations. The distances may not be identical since temperature is measured on gas in the bed and concentration is measured on solids, but they should be nearly the same. The distance required to obtain equilibration will vary somewhat depending on reactor geometry and flow rate of upwardly rising gas.

Let us define "mixing distance" as the distance from a point of addition of a substance beyond which only an equilibrium concentration of that substance will be found. Then, in a preferred embodiment, if catalyst and co-catalyst entry points are located at least about two mixing distances apart, laterally or vertically, there will be no condition under which consistently high concentrations of both substances will exist simultaneously in the same region, and "hot spots" due to this cause will be avoided. As a first approximation, twice the distance required for temperature equilibration to occur, a distance easily measured by those skilled in the art, may be used as the distance of separation of catalyst and co-catalyst feed points. The Figure shows the catalyst feed point being closer to the sieve plate than the co-catalyst entry point. However, the intent of the FIGURE is merely to illustrate their separation, not relative location.

During the activation process, if too much co-catalyst contacts the catalyst particle, the catalytic activity is not only reduced, but actual harm may result. One of the less desirable effects of excess co-catalyst is that oil, such as a low molecular weight oligomer, is generated in the reactor, and this oil can condense in the recycle line at low temperature points. Some of this oil comes out with the product and is responsible for smoke during extrusion and molding operations. It is believed that the oligomeric oil is caused by oligomerization of ethylene by the co-catalyst. In Encyclopedia of Polymer Science and Technology (Interscience Publishers) Vol. 1, pp. 814-5, in the article entitled "Aluminum Compounds", and in the references cited by this article, a growth reaction of aluminum alkyls is explained. An olefin, such as ethylene, can add to an alkyl-aluminum bond. This addition can be repeated up to about a maximum of 25 carbon atoms. The alkyl-aluminum bond can cleave, generating an aluminum-hydride bond and a free oligomer. The hydride bond can then add olefin to regenerate an alkyl-aluminum bond, with the process being repeated. This process is practiced commercially for the synthesis of certain alpha olefins. It appears that excess co-catalyst in the gas-phase reactor can undergo this reaction with the olefins present.

There are various ways of introducing a co-catalyst, hereafter exemplified as TEA, into the reactor to contact the polyolefin-catalyst particles. If pure TEA is injected as a slug of liquid, the TEA wets a certain number of particles, which travel around in the bed, contacting other particles and sharing the excess TEA. This process continues until the TEA has been distributed to a maximum number of particles or consumed by reaction with minor gaseous constituents in the reactor, such as oxygen, CO, and moisture.

The particles which first contact the TEA from the injected slug have too much TEA on their surface. Since excess TEA reduces the activity of the catalyst, these particles show reduced activity. For some particles, the excess TEA is actually harmful in that it increases oil formation, such as by the formation of $C_{10}$–$C_{20}$ hydrocarbons. Following the injection of a slug of TEA, there is a period of time when some of the catalyst particles have excess TEA, some particles have a desirable amount, and some have a deficiency.

When the co-catalyst is unevenly distributed, uneven catalysis takes place. The catalyst particles associated with either deficient or excess amounts of co-catalyst have low activity. The catalyst particles associated with a desirable amount of co-catalyst have high activity. The overall rate of polymerization in the fluidized bed is controlled by externally setting the addition rates of catalyst and co-catalyst. If uneven catalysis is occurring, higher total flows of catalyst and co-catalyst are needed in order to compensate for the catalyst which has low activity. However, as particles having excess catalyst lose this excess by transferring some co-catalyst to other particles in the fluidized-bed, catalyst associated with these particles will increase in activity. Particles having a deficient amount will also increase in activity as they acquire co-catalyst from particles having an excess. "Hot spots" result when particles having excess co-catalyst meet particles with a deficiency and both become more active by redistributing co-catalyst between them. Thus, uneven catalysis leads to inefficient use of catalyst and co-catalyst plus an increased potential for localized "hot spots" and chunk formation. On the other hand, even catalysis (where all catalyst-containing particles have essentially the same high activity) is efficient in the use of catalyst and co-catalyst and does not offer the possibility of sudden localized increases of activity leading to "hot spots" or chunks.

The co-catalyst can be mixed with an inert diluent, such as hexane, and pumped into the reactor as a dilute solution. This method tends to reduce the number of localized pockets of overloaded catalyst particles. But an inert material is introduced into the reactor and must, sooner or later, be removed, such as by purging or venting, from the reactor. This venting also removes at least a portion of active reactants from the reactor. This venting operation, while necessary to keep the concentration of inert materials within acceptable limits, does reduce operating efficiency. The feeding of an inert liquid to the reactor also tends to give larger polymer particles, as taught by Michaels, which may lead to chunk formation.

Dilution of the TEA with olefin monomer has been tried, gives good results, and reduces or removes many of the problems and disadvantages mentioned above in connection with other methods of adding TEA. Ethylene, or any other monomer or co-monomer being used in the polymerization, does not add to the level of inert materials in the gas, does not remain liquid in the reactor to cause particle size growth and chunk formation, is a good solvent for aluminum alkyls, and can be used in large enough amounts to easily give good co-catalyst dispersion in the fluidized bed. However, it would be expected that oligomer formation would increase due to longer contact time between the monomer and aluminum alkyl. Surprisingly, it was found that oligomerization is suppressed if the monomer is in the liquid state rather than the gas state. For example, a 3% TEA solution in liquid ethylene can be stored for 2 days without significantly increasing the amount of oil formed in the polymerization over that formed by fresh solution.

Since liquid olefins and aluminum alkyls are miscible, with minimum stirring, we now prefer to add a continuous stream of olefin monomer-diluted co-catalyst to the reactor, such as by pumping. We have found that the olefin/co-catalyst ratio in the olefin-co-catalyst solution can have limits of operability, varying from about 100,000/1 parts by weight to about 10/1 parts by weight. A typical ratio is from about 10,000/1 to about 1,000/1 parts by weight.

As indicated in the FIGURE, co-catalyst is added to the fluidized bed in the reaction zone separately and independently of the catalyst. The co-catalyst may be added at one or more points, but, for simplicity of explanation, discussion is couched in terms of a single entry point. Obviously, if a multiplicity of catalyst and/or co-catalyst entry points is used, each catalyst entry point must be separated from all co-catalyst entry points by at least the minimum separation distance which is two mixing distances as herein defined. The co-catalyst solution can be fed to the fluidized bed at any height between the sieve plate and the top of the bed so long as the point of addition is sufficiently separated from the nearest catalyst entry point. However, since the top of the fluidized bed can rise and fall, surge and splash, as a result of gas bubbles exiting the bed, it is preferred to add the co-catalyst solution at a point between the sieve plate and a point about ⅞ of the distance from the sieve plate to the top of the bed so that the co-catalyst entry point is always immersed in fluidized solids and never exposed to gas alone. Although the FIGURE shows the co-catalyst entry point located further from the sieve plate than the catalyst lyst entry point, the intent of the FIGURE is to show separation, not to indicate that the positions of the entry points are related in any other way.

The solution of co-catalyst in liquid olefin can be prepared in any way that solutions are prepared. For example, a batch solution can be prepared and fed continuously or semi-continuously from a batch tank to the reaction zone. Alternatively, pure co-catalyst and liquid olefin can be metered separately and continuously into a mixing device, as illustrated in the FIGURE, with the discharge from the mixer fed directly to the reaction zone. The mixing device can be any device that mixes liquids, and can have moving parts such as stirrers or impellers to create mixing, or can have no moving parts, as in static mixers. The solution can be fed to the reaction zone by any appropriate method that allows control and measurement. Included among such methods are pumping and metering from a supply maintained at higher pressure than the reaction zone.

In order to lower and control the density of the ethylene polymer, alpha olefins can be copolymerized with ethylene. Although Ziegler catalysts will copolymerize essentially any alpha olefin with ethylene, there is a practical limit to what can be effectively done in a gas-phase reaction. Generally, alpha olefins having more than 8 carbon atoms have too low a vapor pressure to be used in high enough concentration to have much effect on density. Propylene, butene-1, hexene-1, 4-methyl-pentene-1, and octene-1 are among the alpha olefins useful in copolymerization with ethylene in this invention. If desired, mixtures of alpha olefins having 3 to 8 carbon atoms can be used. By this process, polymers generally considered to be HDPE (high density polyethylene) (densities of 0.940 or greater) and LLDPE (linear low density polyethylene) (densities below 0.940) can be made equally well by adjusting co-monomer concentration in the feed as long as one is using a Ziegler catalyst which gives good incorporation of alpha-olefins.

When adding other olefins, such as propylene or 1-butene as co-monomers, to the reactor, such as when copolymers of HDPE or LLDPE are being made, these olefins can be mixed with ethylene or can be added separately, with or without the co-catalyst. These variables are easily managed by one skilled in the art.

Generally, under the commercial conditions described above, in the absence of a chain-transfer agent, Ziegler catalysts produce a polymer of a molecular weight too high for conventional melt processing. Therefore, in the commercial practice of this invention, the polymerizing gas preferably contains hydrogen to adjust the molecular weight (as determined by melt index) to the desired range for the product being produced. This is done by increasing the hydrogen/ethylene ratio to raise melt index (lower molecular weight), or reducing the ratio to produce the opposite effect. Since Ziegler catalysts vary in their reactivity with hydrogen, and since quite different melt indexes (MI) are required for different products, ranging for example, from about 50 MI for certain injection molding resins to about 0.01 MI for certain large-part blow molding resins, the amount of hydrogen required for melt index may vary widely. Generally, if hydrogen is required, at least 0.1% by volume is used, but as much as 30% can be used with some catalysts for some products.

Generally, the polymerizing gas will contain at least 50% by volume ethylene. If an alpha olefin or mixture of alpha olefins is used to reduce the density of the product, generally at least 0.5% by volume is used. The maximum amount which may be used depends on the vapor pressure of the olefin, the desired density of the polymer product, the relative reactivities of the alpha olefin(s) versus ethylene on the catalyst being used, and upon the pressure and temperature in the reaction zone. With propylene, generally not more than 30% by volume of this polymerizing gas will be used. With higher alpha olefins, less will be used.

As discussed above, some inert gases can also be present. They do not contribute to the polymerization, but enter the system as a result of operational factors such as catalyst feed problems or monomer purity which is less than ideal. Although their presence is acknowledged, since they do not contribute in any way to the polymerization, they are not considered for purposes of defining gas composition as being part of the polymerizing gas. Therefore, with appropriate catalyst and product targets, a polymerizing gas composition can consist essentially of 99.9% ethylene and 0.1% hydrogen for homopolymerization, or 99.4% ethylene, 0.5% C3–C8 olefin and 0.1% hydrogen for copolymerization, all percentages being by volume.

Inasmuch as it has been stated that up to 30% of hydrogen and up to 30% alpha olefin can be present in the polymerization gas, it may appear that the ethylene content of the polymerizing gas could be as low as 40%. This is not the case. With most Ziegler catalysts, there is an interaction between the effect of the olefin and the effect of hydrogen on the melt index such that a given volume % of hydrogen will produce a higher melt index (lower molecular weight) in the presence of an alpha olefin than is produced in its absence. Therefore, there is generally no instance in which the combined total of hydrogen and alpha olefin will exceed 50%, and therefore the polymerization gas will generally contain at least 50% by volume of ethylene.

An added benefit of this invention is that the yield of polymer, based on co-catalyst, is increased. This reduces the cost of co-catalyst per unit weight of polymer produced and also reduces the co-catalyst residues in the final product. For example, increasing the polymer yield, based on the weight of aluminum in TEA co-catalyst, from about 6,000 to about 15,000 reduces the co-catalyst cost and the aluminum residue by about 60%.

To exemplify embodiments of the invention, a background of typical start-up and operating conditions is given.

With about 200 lbs. (90.7 kg) of bed material from a previous run in the reactor, ethylene was added to the reactor loop, and the pressure was increased to 500 psi., (35.1 kg/cm$^2$) with enough gas flow to fluidize the bed. The heat of compression was sufficient to raise the reactor temperature to the range of 195°–205° F. (90°–96° C.). Then, about 53 cc of neat TEA were added to the reactor, as a scavenger for moisture, CO, and oxygen present in the system. This amount of TEA was used to remove these undesirable contaminants and to produce conditions suitable for polymerization. This scavenging amount was not included in the amount of TEA used as the co-catalyst.

The same catalyst composition was used for all examples in order to eliminate catalyst-related variables. Davison 952 silica gel was dried of surface moisture at about 200° C. under nitrogen for about 12 hours, then cooled and slurried in hexane. To the hexane slurry were added, sequentially, triethylaluminum and then vanadium oxytrichloride in order to obtain the catalyst composition of 0.8 mmol triethylaluminum and 0.1 mmol VOC$_3$ per gram of dry silica. The hexane was then vaporized to give dry catalyst powder. This catalyst is the catalyst of Example I of U.S. Pat. No. 4,426,317 (Rogers).

When on-line gas analyzers showed that the moisture was below 10 ppm, oxygen below 1 ppm and CO was undetectable, a dry, supported, vanadium-based, Ziegler catalyst, prepared as described above, was added to the bed at a rate so as to attain and maintain a concentration in the polymer bed of from about 0.1 to about 100 ppm, by weight, of the transition metal (here, V). A halogen-containing promoter, such as CHCl$_3$, can also be added as described in U.S. Pat. No. 4,435,520 (Aylward). An appropriate amount of co-monomer, such as propylene, was also added. A general level of propylene in the total gas stream was about 2 molar %. A measurable polymerization reaction was noted by a measurable temperature increase across the reactor bed. This bed temperature was regulated by the rate of cooling water flow in the heat exchanger.

The flow of co-catalyst to the reactor bed was started simultaneously with the flow of catalyst, to assure a desirable polymerization rate. And product was removed periodically from the reactor while fresh olefin was introduced.

As mentioned earlier, low molecular weight polymer oils can be formed. These undesirable oils can form smoke during extrusion and processing operations. The amount of these oils in a product sample can be determined by carbon tetrachloride ($CCl_4$) extraction, followed by gas chromatography (previously calibrated using internal standards).

A product sample, ground to 10 mesh in a Wiley mill, was extracted with $CCl_4$ at 55° C. for 2 hours, in a closed bottle. The bottle was then cooled to room temperature, and a sample was injected into a Hewlett-Packard 5880A flame ionization gas chromatograph. The concentrations of the $C_{10}$-$C_{20}$ straight chain hydrocarbons were obtained directly from the plotter printout. These concentrations were reported as total $CCl_4$ extractables.

Variations in feeding the co-catalyst are now introduced, to show the value of the invention. Operating difficulties and product properties are noted for these variations.

Example I—Using Neat (100%) TEA

With the reactor stabilized at the conditions given above for the production of polyethylene using a vanadium-based Ziegler catalyst, co-catalyst (TEA) was added as a neat liquid at a point approximately 2 feet (60 cm.) above the location of the catalyst addition point. Based on the operating conditions and the conformation of the reactor used, this distance separating the catalyst feed point and the co-catalyst feed point was approximately 4 mixing distances, as discussed above. Over a 48-hour period, 11.3 cc of neat TEA were added per hour, by 1 cc injections into the catalyst bed, with catalyst also being added so as to maintain a vanadium metal concentration of from about 2 to about 3 ppm, by weight. Twice during this operating period, the co-catalyst injection point plugged, as noted by the absence of liquid level lowering in the sight glass. This plugging was theorized as being due to polymer formation at the injection point outlet into the reactor. The plug was removed by increasing the pressure differential between the co-catalyst feed line and the reactor, after which normal polymerization resumed.

One important and easily measurable indication of product quality is the yield based on aluminum, that is, the pounds of polyolefin produced per pound of aluminum added. A desirable yield based on aluminum is greater than 15,000 lbs. of polyethylene per pound of aluminum added.

The yield based on aluminum for this run was about 6,000 lbs. of polyethylene per pound of aluminum added.

An analysis of the product from this run, to determine the amount of $C_{10}$-$C_{20}$ oils by $CCl_4$ extraction, showed a total of 2317 ppm.

During another run, duplicating the above conditions, chunk formation (the formation of clumps of polymer, possibly due to fusing of many individual particles as a result of a temperature surge) was noted, since the product take-off line became plugged. Opening of the reactor revealed several clumps, or chunks, approximately fist size.

Example II—Using 10 wt. % TEA In Hexane

With the reactor and polymerization stabilized as in Example I, catalyst was added at the same rate, while the co-catalyst was varied. Instead of neat TEA, a 10 wt. % solution of TEA in hexane was used. This variation offered a diluted co-catalyst to the reactor bed, but it also introduced an inert (hexane) into the system. The presence of added inert material required a higher purge rate, to maintain a desirable inert level. The hexane-diluted TEA was pumped into the reactor at a rate of 52 cc/hour (equivalent to 5.2 cc neat TEA/hr). The diluted TEA was used more efficiently in this Example, since the same production rate was achieved as in Example I.

Termination of duplicate runs using 10% hexane-TEA, due to chunk formation, was less frequent than terminations of runs involving neat TEA.

The yield based on aluminum for several duplicate runs based on this Example was in the range of 10,000 –12,000.

The $CCl_4$ extracted oils from this run amounted to 533 ppm, indicating that the method of adding a diluted solution of co-catalyst resulted in a reduction of smoke-producing oils.

Example III—Dilution of 10 wt. % TEA-hexane with Propylene

Using the conditions of Example II, with 10 wt. % TEA hexane, propylene co-monomer was added simultaneously with the TEA co-catalyst by use of the static mixer noted in the Figure. The addition rate of TEA-hexane was 31 cc/hr. (equivalent to 3.1 cc neat TEA), mixed with a stream of propylene fed at a rate of 1.8 lbs. (0.8 kg)/hr. This method gave a further dilution of the TEA and also showed that TEA and propylene were miscible.

Duplicate runs showed less chunk formation in the product take-off than in previous examples.

The yield based on aluminum was about 22,000.

The $CCl_4$ extractables for this run amounted to 350 ppm. This is a reduction of smoke-producing oils noted in Examples I and II above.

Example III-A Dilution of 10% wt. % TEA In Hexane With Ethylene

This example is similar to Example III except that co-monomer propylene was added through the co-monomer line, while a portion of ethylene was mixed with TEA-hexane and added through the mixer line, shown in the Figure. The addition rate of TEA-hexane was 44 cc/hr. (equivalent to 4.4 cc neat TEA), this TEA-hexane stream was mixed with ethylene (2 lbs. (0.9 kg)/hr.), and the resultant mixture was fed to the reactor. The TEA-hexane mixed with the ethylene easily, with no problems in feeding the mixture to the reactor.

The yield based on aluminum was about 16,000.

Example IV—3 Wt. % TEA in Hexane With Ethylene

This Example was carried out similarly to Example III-A, except that 3 wt. % TEA in hexane was used. In one of the feed lines to the static mixer, 3 wt. % TEA-hexane solution was added at a rate of 60 cc/hr. (1.8 cc/hr. neat), with this solution being mixed with 2 lbs.

(0.9 kg) ethylene/hr., and the resultant mixture being added to the reactor, with no mixing or feeding problems.

The yield based on aluminum was about 30,000 lbs. of polyolefin per lb. of aluminum, and the extractables were lower than those in Ex. III.

Examples III-A and IV show that decreasing weight percentages of TEA in hexane can be mixed with ethylene, with the diluted mixture being added to the reactor. The yield based on aluminum added increases, and no mixing or feeding problems are noted. When neat TEA is mixed with ethylene to give a 3 wt. % TEA solution, no hexane is added as an inert material, and polymerization proceeds smoothly. It is expected that the yield based on aluminum added will increase and that the CCl$_4$ extractables will decrease.

Example V—Mixing Distance

Thermocouples were inserted into the reactor below the sieve plate, immediately above the sieve plate, and at a number of other points. The reactor was started up with the catalyst and TEA injection points located as in Example I. Stable operating conditions were established at about 500 psi (35.1 kg/cm$^2$) pressure and about 199° F. (93° C.) temperature, with a linear flow rate of gas through the bed of about 30 cm/sec, which was about twice the minimum gas flow for fluidization. The temperature profile in the reactor was then noted. The thermocouple just below the sieve plate registered the temperature of the incoming gas. The thermocouple measuring the temperature at the top of the sieve plate indicated a slightly higher temperature than the incoming gas, but substantially below the average bed temperature. All thermocouples located at different points within the fluidized bed at least 15 cm or more above the sieve plate recorded essentially the same temperature, about 199° F. (93° C.), which was considered to be the average temperature of the bed. No radial temperature variations could be seen, and no significant axial temperature differences were observed between thermocouples located at different points at least 15 cm above the sieve plate.

This Example shows that the mixing distance is about 15 cm for the reactor and gas flow rate used in these Examples.

Example VI—TEA Addition Point

The run of Example II was repeated with the exception that the TEA addition point was located about 5"(13 cm) from the catalyst addition point. Within a short period of time, such as about 1 day, chunks formed due to localized temperature rises in the reactor bed, causing the reactor to be shut down to remove them.

After the reactor had been freed of chunks, the run was repeated except that the TEA entry point was relocated to a point about 2 feet (60 cm.) from the catalyst entry point. The reactor was run around the clock for over 30 days.

Example VII—Slurry Catalyst Feed

In order to determine whether catalyst could be fed as a slurry, a hexane slurry of the catalyst used in Example I was prepared and fed to the reactor in place of the dry catalyst feed, but at the same catalyst rate, based on weight of dry catalyst. The TEA feed was introduced at a point about 2 feet (60 cm.) from the catalyst inlet. Chunks formed so rapidly, plugging the product take-off line, that the reactor and polymerization did not have time to stabilize, due to feeding the catalyst as a slurry.

Example VIII—Simultaneous Feed

A portion of the same catalyst used in the previous Examples was slurried in hexane and the amount of TEA calculated to be needed as co-catalyst was added to the slurry. The hexane was evaporated, leaving the TEA coated on the supported catalyst particles. The resulting dry powder was then fed through the catalyst feeder to the reactor without other addition of co-catalyst. Although chunks did not form as rapidly as in Example VIII, they formed more rapidly than in Example I, and the reactor could only be operated for such short periods of time that an on-line operating efficiency factor, as explained below, was not determined.

The Examples show that, in order to obtain desirable product and long-time operation with a minimum of operating problems, (1) the catalyst should be fed dry and (2) the co-catalyst should be fed separately at an injection point equal to or greater than about two mixing distances from the catalyst injection point. Dilution of the co-catalyst with a liquid, vaporizable, polymerizable olefin prior to introduction of the co-catalyst into the reactor offers a means of increasing the yield of polyolefin based on the aluminum added and a means of decreasing the amount of CCl$^4$ extractables. These operating practices reduce the amount of chunk formation and subsequent down-time for chunk removal.

Another measure of operating efficiency of a polymerization reactor is the percentage of on-line operation hours per month. One important factor in on-line operation is the amount of down time caused by chunk formation and subsequent plugging of the product take-off system.

A consistent improvement in on-line operating efficiency was noted, from a low of about 49–63% for neat TEA to 67–80% for the 10% TEA-hexane to 80–90% for 10%TEA-hexane diluted with olefin. An on-line operating efficiency of greater than 90% is expected when TEA is increasingly diluted with ethylene.

As the olefin/co-catalyst ratio is increased beyond the ratio of Example IV, the yield on aluminum is expected to increase. At the same time, the efficiency of operation is expected to increase due to the expected decrease in chunk formation. And the venting of inerts is expected to decrease, due to the use of olefin as a co-catalyst diluent instead of hexane.

We claim:

1. A method for polymerizing olefins in a gas-phase, fluidized-bed, vertical polymerization reactor which is under operating conditions for polymerizing olefins using a polymerizing composition having at least one polymerizable olefin, said method comprising the steps of:

(a) introducing a Ziegler catalyst as a dry powder at a first injection point into the gas-phase, fluidized-bed, vertical polymerization reactor that contains a polymerizable composition comprising hydrogen, at least one polymerizable olefin, and a co-monomer olefin; and (b) introducing, simultaneously with the introduction of the dry Ziegler catalyst, a mixture comprising a co-catalyst and a liquid olefin at a reaction-sustaining rate into said gas-phase, fluidized bed, vertical polymerization reactor at a second injection point located at least about two mixing distances away from the first injection point, wherein one mixing distance is the distance from an injection point beyond which only an equilibrium concentration of the catalyst or co-catalyst will be found, and whereby a polymerized olefin product is obtained with a decrease in the formation of polymerized olefin lumps in the gas-phase, fluidized-bed, vertical polymerization reactor, while simultaneously having an increase in the yield of the polymerized olefin product with respect to the amount of the co-catalyst used and a reduction in the formation of oil in the gas-phase, fluidized-bed, vertical polymerization reactor, when compared to a process not employing a dry Ziegler catalyst in a vertical reactor and not introducing the dry Ziegler catalyst, simultaneously with the introducing of the co-catalyst/liquid olefin mixture, at an injection point located at least about two mixing distances away from the injection point of the co-catalyst-/liquid olefin mixture.

2. A method for polymerizing olefins in a gas-phase, fluidized-bed, vertical polymerization reactor which is under operating conditions for polymerizing olefins using a polymerizing composition having at least one polymerizable olefin, said method comprising the step of:

(a) introducing a Ziegler catalyst as a dry powder at a first injection point into the gas-phase, fluidized-bed, vertical polymerization reactor that contains a polymerizable composition comprising hydrogen, at least one polymerizable olefin, and a co-monomer olefin; and (b) introducing, simultaneously with the introduction of the dry Ziegler catalyst, a mixture comprising a co-catalyst and a liquid olefin at a reaction-sustaining rate into said gas-phase, fluidized-bed, vertical polymerization reactor at a second injection point located at least about two mixing distances away from the first injection point, wherein one mixing distance is the distance from an injection point beyond which only an equilibrium concentration of the catalyst or co-catalyst will be found.

3. A method for polymerizing olefins in a gas-phase, vertical polymerization reactor which is under operating conditions for polymerizing olefins using a polymerizing composition having at least one polymerizable olefin, said method comprising the steps of:

(a) introducing a Ziegler catalyst as a dry powder at a first injection point into the gas-phase, vertical polymerization reactor that contains a polymerizable composition comprising hydrogen, at least one polymerizable olefin, and a co-monomer olefin; and (b) introducing, simultaneously with the introduction of the dry Ziegler catalyst, a mixture comprising a co-catalyst and a liquid olefin at a reaction-sustaining rate into said gas-phase, vertical polymerization reactor at a second injection point located at least about two mixing distances away from the first injection point, wherein one mixing distance is the distance from an injection point beyond which only an equilibrium concentration of the catalyst or co-catalyst will be found.

4. A method for polymerizing ethylene in a gas-phase, fluidized-bed, vertical polymerization reactor comprising the steps of:

(a) introducing ethylene, hydrogen, and a co-monomer olefin into the gas-phase, fluidized-bed, vertical polymerization reactor;

(b) adding a vanadium-based Ziegler catalyst as a dry powder into the vertical polymerization reactor, at a first injection point, so as to attain and maintain a concentration in the fluidized-bed of from about 0.1 to about 100 ppm, by weight, of vanadium;

(c) forming a mixture comprising a triethyl aluminum co-catalyst and a liquid ethylene monomer or a liquid co-monomer selected from the group consisting of from $C_3$ to $C_8$ alpha olefins, wherein the liquid ethylene monomer or the liquid co-monomer/co-catalyst weight ratio varies from about 10/1 to about 100,000/1;

(d) attaining and maintaining an operating temperature in the vertical reactor of from about 122° F. (50° C.) to about 248° F. (120° C.);

(e) attaining and maintaining an operating pressure in the vertical reactor of from about 100 psi (7.0 kg/cmz) to about 600 psi (42.2 kg/cm$^2$);

(f) introducing the mixture of step (c) at a reaction-sustaining rate into said gas-phase, fluidized-bed, vertical polymerization reactor at a second injection point located at least two mixing distances away from the first injection point, wherein one mixing distance is the distance from an injection point beyond which only an equilibrium concentration of the catalyst or co-catalyst will be found; and whereby an ethylene polymer is produced with a reduction in the formation of oil in the gas-phase, fluidized-bed, vertical polymerization reactor, when compared to a process not employing a dry Ziegler catalyst in a vertical reactor and not introducing the dry Ziegler catalyst, simultaneously with the introducing of the co-catalyst/liquid olefin mixture, at an injection point located at least about two mixing distances away from the injection point of the co-catalyst/liquid olefin mixture; and (g) removing ethylene polymer from the vertical polymerization reactor.

5. The method of claim 1 additionally comprising mixing the co-catalyst with the liquid olefin prior to said step (b).

6. The method of claim 2 additionally comprising mixing the co-catalyst with the liquid olefin prior to said step (b).

7. The method of claim 3 additionally comprising mixing the co-catalyst with the liquid olefin prior to said step (b).

8. The method of claim 1.wherein said liquid olefin is a vaporizable, polymerizable olefin.

9. The method of claim 2 wherein said liquid olefin is a vaporizable, polymerizable olefin.

10. The method of claim 3 wherein said liquid olefin is a vaporizable, polymerizable olefin.

11. The method of claim 1 wherein said Ziegler catalyst is vanadium-based.

12. The method of claim 2 wherein said Ziegler catalyst is vanadium-based.

13. The method of claim 3 wherein said Ziegler catalyst is vanadium-based.

14. The method of claim 1 wherein the olefin/co-catalyst weight ratio in the olefin/co-catalyst mixture varies from about 10/1 to about 100,000/1.

15. The method of claim 2 wherein the olefin/co-catalyst weight ratio in the olefin/co-catalyst mixture varies from about 10/1 to about 100,000/1.

16. The method of claim 3 wherein the olefin/co-catalyst weight ratio in the olefin/co-catalyst mixture varies from about 10/1 to about 100,000/1.

17. The method of claim 1 wherein the vertical reactor temperature varies from about 122° F. (50° C.) to about 248° F. (120 ° C.).

18. The method of claim 2 wherein the vertical reactor temperature varies from about 122° F. (50° C.) to about 248° F. (120° C.).

19. The method of claim 3 wherein the vertical reactor temperature varies from about 122° F. (50° C.) to about 248° F. (120° C.)

20. The method of claim 1 wherein the vertical reactor pressure varies from about 100 psi (7.0 kg/cm$^2$) to about 600 psi (42.2 kg/cm$^2$).

21. The method of claim 2 wherein the vertical reactor pressure varies from about 100 psi (7.0 kg/cm) to about 600 psi (42.2 kg/cm).

22. The method of claim 3 wherein the vertical reactor pressure varies from about 100 psi (7.0 kg/cm$^2$) to about 600 psi (42.2 kg/cm$^2$).

23. The method of claim 1 wherein the liquid olefin/co-catalyst mixture comprises liquid ethylene as the liquid olefin and triethyl aluminum as the co-catalyst.

24. The method of claim 2 wherein the liquid olefin/co-catalyst mixture comprises liquid ethylene as the liquid olefin and triethyl aluminum as the co-catalyst.

25. The method of claim 3 wherein the liquid olefin/co-catalyst mixture comprises liquid ethylene as the liquid olefin and triethyl aluminum as the co-catalyst.

26. The method of claim 23 wherein the polymer yield by weight based on the weight of aluminum in the triethyl aluminum co-catalyst used is greater than about 15,000.

27. The method of claim 24 wherein the polymer yield by weight based on the weight of aluminum in the triethyl aluminum co-catalyst used is greater than about 15,000.

28. In a process for the polymerization of at least one olefin utilizing a gas-phase, vertical polymerization reactor which is under operating conditions using a polymerizing composition having at least one polymerizable olefin which has been at least partially polymerized by the action of a Zielger catalyst that is introduced as a dry powder into the vertical reactor at a first injection point, the improvement comprising depositing a co-catalyst on the polymerized olefin by introducing a mixture comprising the co-catalyst and a liquid, vaporizable, polymerizable olefin at a reaction-sustaining rate into the gas-phase, vertical polymerization reactor at a second injection point located at least about two mixing distances away from the first injection point, wherein one mixing distance is the distance from an injection point beyond which only an equilibrium concentration of the catalyst or co-catalyst will be found.

29. The process of claim 28 wherein said gas-phase, vertical polymerization reactor includes a fluidized-bed.

30. The process of claim 28 wherein said liquid olefin/co-catalyst mixture comprises liquid ethylene as the liquid olefin and triethyl aluminum as the co-catalyst.

31. The process of claim 28 wherein the Ziegler catalyst is vanadium based.

32. The method of claim 28 wherein the olefin/co-catalyst weight ratio in the olefin/co-catalyst mixture varies from about 10/1 to about 100,000/1.

33. The method of claim 28 wherein the vertical reactor temperature varies from about 122° F. to about 248° F.

34. The method of claim 28 wherein the vertical reactor pressure varies from about 100 psi to about 600 psi.

35. The process of claim 30 wherein the polymer yield by weight based on the weight of aluminum in the triethyl aluminum co-catalyst used is greater than about 15,000.

36. The process of claim 1 comprising two or more first injection points wherein the second injection point is located at least about two mixing distances away from any particular first injection point.

37. The process of claim 1 comprising two or more second injection points wherein the first injection point is located at least about two mixing distances away from any particular second injection point.

38. The process of claim 1 comprising two or more first injection points and two or more second injection points, wherein any particular first injection point is located at least two mixing distances from any second injection point.

39. The process of claim 2 comprising two or more first injection points wherein the second injection point is located at least about two mixing distances away from any particular first injection point.

40. The process of claim 2 comprising two or more second injection points wherein the first injection point is located at least about two mixing distances away from any particular second injection point.

41. The process of claim 2 comprising two or more first injection points and two or more second injection points, wherein any particular first injection point is located at least two mixing distances from any second injection point, and any particular second injection point is located at least two mixing distances from any first injection point.

42. The process of claim 3 comprising two or more first injection points wherein the second injection point is located at least about two mixing distances away from any particular first injection point.

43. The process of claim 3 comprising two or more second injection points wherein the first injection point is located at least about two mixing distances away from any particular second injection point.

44. The process of claim 3 comprising two or more first injection points and two or more second injection points, wherein any particular first injection point is located at least two mixing distances from any second injection point.

45. The process of claim 4 comprising two or more first injection points wherein the second injection point is located at least about two mixing distances away from any particular first injection point.

46. The process of claim 4 comprising two or more second injection points wherein the first injection point is located at least about two mixing distances away from any particular second injection point.

47. The process of claim 4 comprising two or more first injection points and two or more second injection points, wherein any particular first injection point is located at least two mixing distances from any second injection point.

48. The process of claim 28 comprising two or more first injection points wherein the second injection point is located at least about two mixing distances away from any particular first injection point.

49. The process of claim 28 comprising two or more second injection points wherein the first injection point is located at least about two mixing distances away from any particular second injection point.

50. The process of claim 28 comprising two or more first injection points and two or more second injection points, wherein any particular first injection point is located at least two mixing distances from any second injection point.

51. The method of claim 11 wherein said vanadium-based Ziegler catalyst comprises $VOCl_3$.

52. The method of claim 12 wherein said vanadium-based Ziegler catalyst comprises $VOCl_3$.

53. The method of claim 13 wherein said vanadium-based Ziegler catalyst comprises $VOCl_3$.

54. A method for polymerizing olefins in a gas-phase, fluidized-bed, vertical polymerization reactor which is under operating conditions for polymerizing olefins using a polymerizing composition having at least one polymerizable olefin, said method comprising the steps of:
(a) introducing a vanadium-based Ziegler catalyst as a dry powder at a first injection point into the gas-phase, fluidized-bed, vertical polymerization reactor that contains a polymerizable composition comprising hydrogen, at least one polymerizable olefin, and a co-monomer olefin; and
(b) introducing, simultaneously with the introduction of the dry vanadium-based Ziegler catalyst, a mixture comprising a co-catalyst and a liquid olefin at a reaction-sustaining rate into said gas-phase, fluidized bed, vertical polymerization reactor at a second injection point located at least about two mixing distances away from an injection point, wherein one mixing distance is the distance from an injection point beyond which a temperature equilibration within the vertical polymerization reactor exists due to an equilibrium concentration of the catalyst or co-catalyst.

55. A method for polymerizing ethylene in a gas-phase, fluidized-bed, vertical polymerization reactor comprising the steps of:
(a) introducing ethylene, hydrogen, chloroform, and optionally, one or more co-monomers selected from the group consisting of from $C_3$ to $C_8$ alpha olefins, into the gas-phase fluidized-bed, vertical polymerization reactor;
(b) adding a Ziegler catalyst as a dry powder into the vertical polymerization reactor, at a first injection point, wherein preparation of the Ziegler catalyst comprises the steps of (i) reacting a dry silica support with triethyl aluminum, (ii) and, subsequently, reacting the triethyl aluminum-dry silica support with a vanadium compound selected from the group consisting of $VOCl_3$, $VCl_4$, and mixtures thereof, and whereby the vanadium concentration in the fluidized-bed, vertical polymerization reactor is attained and maintained of from about 1 to about 4 ppm, by weight, of vanadium;
(c) attaining and maintaining an operating temperature in the vertical polymerization reactor of from about 175° F. (80° C.) to about 240° F. (115° C.);
(d) attaining and maintaining an operating pressure in the vertical polymerization reactor of from about 475 psi to about 525 psi;
(e) introducing a mixture comprising a triethyl aluminum co-catalyst and a liquid ethylene monomer or a liquid co-monomer selected from the group consisting of from $C_3$ to $C_8$ alpha olefins; at a reaction-sustaining rate into said gas-phase, fluidized-bed, vertical polymerization reactor at a second injection point located at least two mixing distances away from the first injection point, wherein one mixing distance is the distance from an injection point beyond which only an equilibrium concentration of the catalyst or co-catalyst will be found, and whereby an ethylene polymer is produced with a reduction in the formation of oil in the gas-phase, fluidized-bed, vertical polymerization reactor, when compared to a process not employing a dry Ziegler catalyst in a vertical reactor and not introducing the dry Ziegler catalyst, simultaneously with the introducing of the co-catalyst/liquid olefin mixture, at an injection point located at least about two mixing distances away from the injection point of the co-catalyst/liquid olefin mixture; and
(f) removing ethylene polymer from the vertical polymerization reactor.

56. The method of claim 55 wherein the liquid ethylene monomer or the liquid co-monomer/co-catalyst weight ratio varies from about 10/1 to about 100,000/1.

57. A method for polymerizing ethylene in a gas-phase, fluidized-bed, vertical polymerization reactor comprising the steps of:
(a) introducing ethylene, hydrogen, chloroform, and propylene into the gas-phase fliudized-bed, vertical polymerization reactor;
(b) adding a Ziegler catalyst as a dry powder into the vertical polymerization reactor, at a first injection point, wherein preparation of the Ziegler catalyst comprises the steps of (i) reacting a dry silica support with triethyl aluminum, (ii) and, subsequently, reacting the triethyl aluminum-dry silica support with $VOCl_3$ whereby the vanadium concentration in the fluidized-bed, vertical polymerization reactor is attained and maintained at from about 1 to about 4 ppm, by weight, of vanadium;
(c) forming a mixture comprising a triethyl aluminum co-catalyst and a liquid ethylene monomer wherein the liquid ethylene monomer/co-catalyst weight ratio varies from about 30/1 to about 1,000/1;
(d) attaining and maintaining an operating temperature in the vertical polymerization reactor of from about 175° F. (80° C.) to about 240° F. (115° C.);
(e) attaining and maintaining an operating pressure in the vertical polymerization reactor of from about 475 psi to about 525 psi;
(f) introducing said mixture of step (c) at a reaction-sustaining rate into said gas-phase, fluidized-bed, vertical polymerization reactor at a second injection point located at least two mixing distances away from the first injection point, wherein one mixing distance is the distance from an injection point beyond which only an equilirium concentration of the catalyst or co-catalyst will be found, and whereby an ethylene polymer is produced with a reduction in the formation of oil in the gas-phase, fluidized-bed, vertical polymerization reactor, when compared to a process not employing a dry Ziegler catalyst in a vertical reactor and not introducing the dry Ziegler catalyst, simultaneously with the introducing of the co-catalyst/liquid olefin mixture, at an injection point located at least about two mixing distances away from the injection point of the co-catalyst/liquid olefin mixture; and
(g) removing ethylene polymer from the vertical polymerization reactor.

58. The method of claim 57 wherein said fluidized bed comprises said Ziegler catalyst, said co-catalyst, and ethylene polymer.

* * * * *